United States Patent [19]
Hutchison et al.

[11] Patent Number: 5,954,569
[45] Date of Patent: Sep. 21, 1999

[54] SECURITY DEVICE FOR REMOVING THE INFORMATION BEARING LAYER AND DATA OF A COMPACT DISC

[75] Inventors: Roger S. Hutchison, Golden, Colo.; Philip Teo Chwee Lock; Phua Swee Hoe, both of Singapore, Singapore

[73] Assignee: CD Rom, Inc., Golden, Colo.

[21] Appl. No.: 09/079,579

[22] Filed: May 15, 1998

[51] Int. Cl.$^6$ ..................................................... B24B 7/00
[52] U.S. Cl. ........................... 451/63; 451/270; 451/271
[58] Field of Search ............................. 451/63, 271, 270, 451/278, 358

[56] References Cited

U.S. PATENT DOCUMENTS 5,690,542  11/1997  Ikemoto .................................. 451/271

OTHER PUBLICATIONS

Security Engineered Machinery Co., Inc., Apr. 29, 1998, Security Engineered Machinery, p.1. *Degaussers*, Apr. 30, 1998, Security Engineered Machinery, pp.1–2.
The DeClassifier: It Slices, It Dices, It Totally Disintegrates Digital Data, Mar. 12, 1998, The Wall Street Journal, pp. 1–3.

*Primary Examiner*—David A. Scherbel
*Assistant Examiner*—Shantese McDonald
*Attorney, Agent, or Firm*—John L. Isaac; Lee, Fishman & Isaac

[57] ABSTRACT

A device is disclosed for removing the information bearing surface and the data carried thereby from the substrate layer of a compact disc. The device includes a housing having an upper portion defining a top surface and a central cavity and a lower portion having interior and exterior surfaces. The lower portion is selectively attachable to the upper portion to enclose the lower portion interior surface within the cavity, the interior surface being sized and shaped for selectively carrying a compact disc. A mechanism is disposed within the cavity for physically removing the information bearing surface of a compact disc positioned on the lower portion interior surface. A member is provided for continuously biasing the physical removal mechanism against the information bearing surface of a compact disc positioned on the interior surface as the information bearing surface is being removed. Finally, an element is provided for actuating the physical removal mechanism.

24 Claims, 9 Drawing Sheets

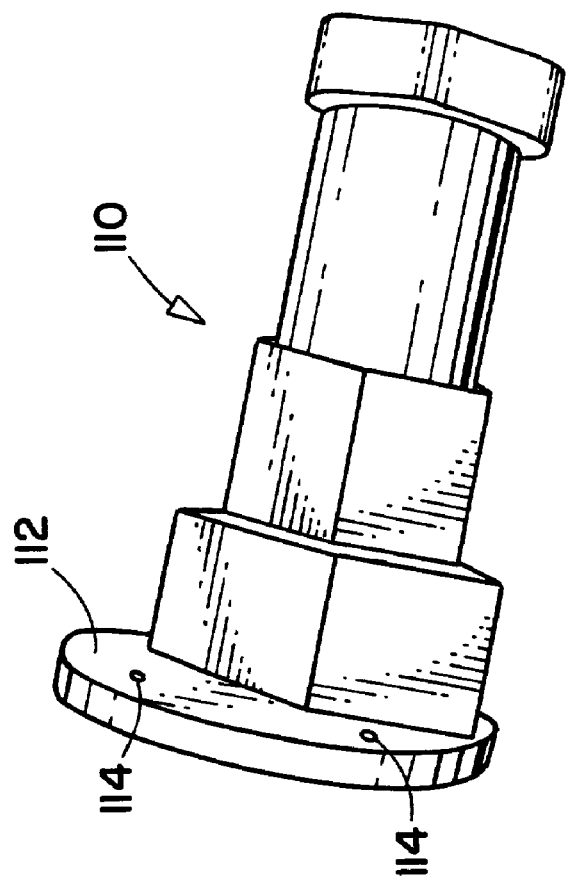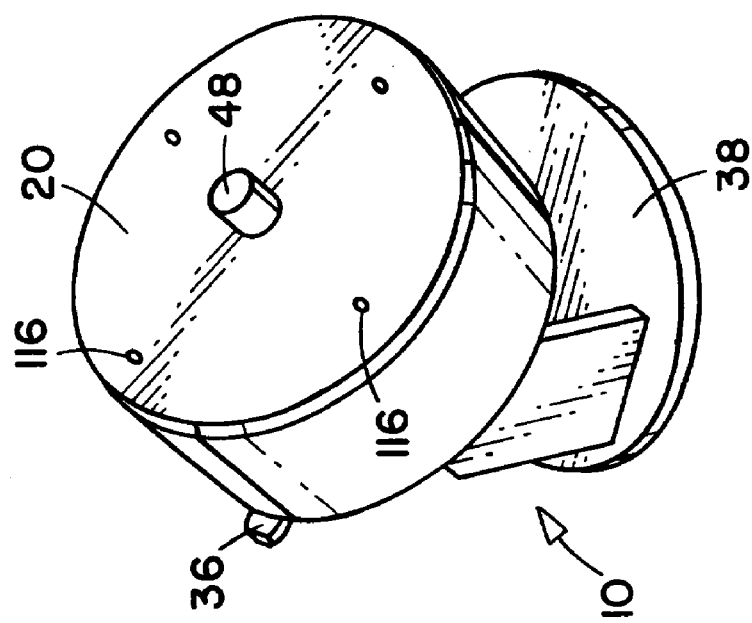
FIG. 9

SECURITY DEVICE FOR REMOVING THE INFORMATION BEARING LAYER AND DATA OF A COMPACT DISC

BACKGROUND OF THE INVENTION

1. Field of the Invention

This invention relates, generally, to security related devices for destroying industrial and government proprietary and confidential information and, more particularly, to devices adapted for destroying information contained on compact disc media. Specifically, the present invention relates to devices designed to completely destroy information and data contained on compact discs which devices are quick and convenient to operate while being highly dependable and efficient.

2. Description of the Prior Art

Corporate and government security procedures have long utilized destruction techniques and devices to prevent the unnecessary storage and unauthorized distribution of sensitive or confidential information. Such destruction frequently takes place routinely according to pre-determined time schedules as well as in emergency situations. Previously, incinerators as well as paper shredders of various sizes and speeds have been utilized to destroy government or corporate proprietary and confidential information both routinely as well as during emergency situations, such as during the takeover of the U.S. Embassy in Tehran or on board U.S. warships. Unfortunately, the mere volume of such confidential paper documents prohibits an effective emergency destruction process. Moreover, even paper shredders having very fine shredding capability are not entirely effective in preventing the reconstruction of the documents and retrieval of at least some of the information contained therein.

This, too, became apparent during the Tehran incident.

With an ever growing demand for compact disc related products as well as the continuing increase in data storage capacity of such discs, businesses and government agencies are placing more and more sensitive and corporate-confidential information on compact discs (CD's). While such compact and efficient data storage media has significantly reduced the volume problem associated with prior confidential paper documents as discussed above, such compact disc storage has created problems of its own, such as how to destroy a compact disc or at least the information contained thereon once it has been created.

In response to this ever increasing media storage form, the Department of Defence (DOD) has issued secure destruction standards for compact disc media. Specifically, DOD requires that when the information bearing surface (IBS) of a CD is altered to the extent that no exploitable information can be recovered, then the CD is considered securely destroyed. The principal goal of any destruction process for compact discs is to assure that no exploitable information can be recovered from the information bearing layer of the compact disc. If a destruction process consumes the entire compact disc, the resulting particles can be no larger than 0.25 mm or 250 microns in any dimension. Alternatively, if the destruction process destroys only the information bearing surface layer of the compact disc, then the dimensions of the resulting particulate residue cannot be greater than 0.25 mm or 250 microns, while the remaining polycarbonate substrate layer cannot be greater than 1.05 mm±0.03 mm thick.

To date, the only known device specifically designed to declassify or securely destroy compact discs by removing the information contained thereon is a 50+ pound tower device manufactured and sold by Security Engineered Machinery Company of Westboro, Mass. This device is intended to cut and pulverize entire compact discs and is of sufficient weight and size to prevent easy mobility and field use. Moreover, it is electronic and therefore requires a power source to be operative. Thus, there remains a need in the industry for a device which quickly and efficiently removes the information bearing surface of a compact disc in particulate sizes meeting at least DOD's minimum requirements yet retains the base substrate layer intact for reuse. Moreover, there is still a requirement for a CD declassification or destruction device which is portable, does not require external power and thus is capable of autonomous field use such as with mobile military units, Naval vessels, aircraft and the like.

SUMMARY OF THE INVENTION

Accordingly, it is one object of the present invention to provide a device for removing proprietary and confidential information from a compact disc.

It is another object of the present invention to provide such a device which can be operated quickly yet assures complete destruction of the information or data contained on a compact disc.

Still another object of the present invention is to provide such a device which is light weight and field portable yet capable of both manual as well as motorized operations.

To achieve the foregoing and other objects and in accordance with the purposes of the present invention, as embodied and broadly described herein, a device is disclosed for removing the information bearing surface and the data carried thereby from the substrate layer of a compact disc. The device includes a housing having an upper portion defining a top surface and a central cavity and a lower portion having interior and exterior surfaces. The lower portion is selectively attachable to the upper portion to enclose the lower portion interior surface within the cavity, the interior surface being sized and shaped for selectively carrying a compact disc. A mechanism is disposed within the cavity for physically removing the information bearing surface of a compact disc positioned on the lower portion interior surface. A member is provided for continuously biasing the physical removal mechanism against the information bearing surface of a compact disc positioned on the interior surface as the information bearing surface is being removed. Finally, an element is provided for actuating the physical removal mechanism.

BRIEF DESCRIPTION OF THE DRAWINGS

The accompanying drawings which are incorporated in and form a part of the specification illustrate preferred embodiments of the present invention and, together with a description, serve to explain the principles of the invention. In the drawings:

FIG. 9 is a side schematic view of a motorized embodiment of the present invention with the motor detached therefrom.

DETAILED DESCRIPTION OF THE PREFERRED EMBODIMENTS

Figure 1:
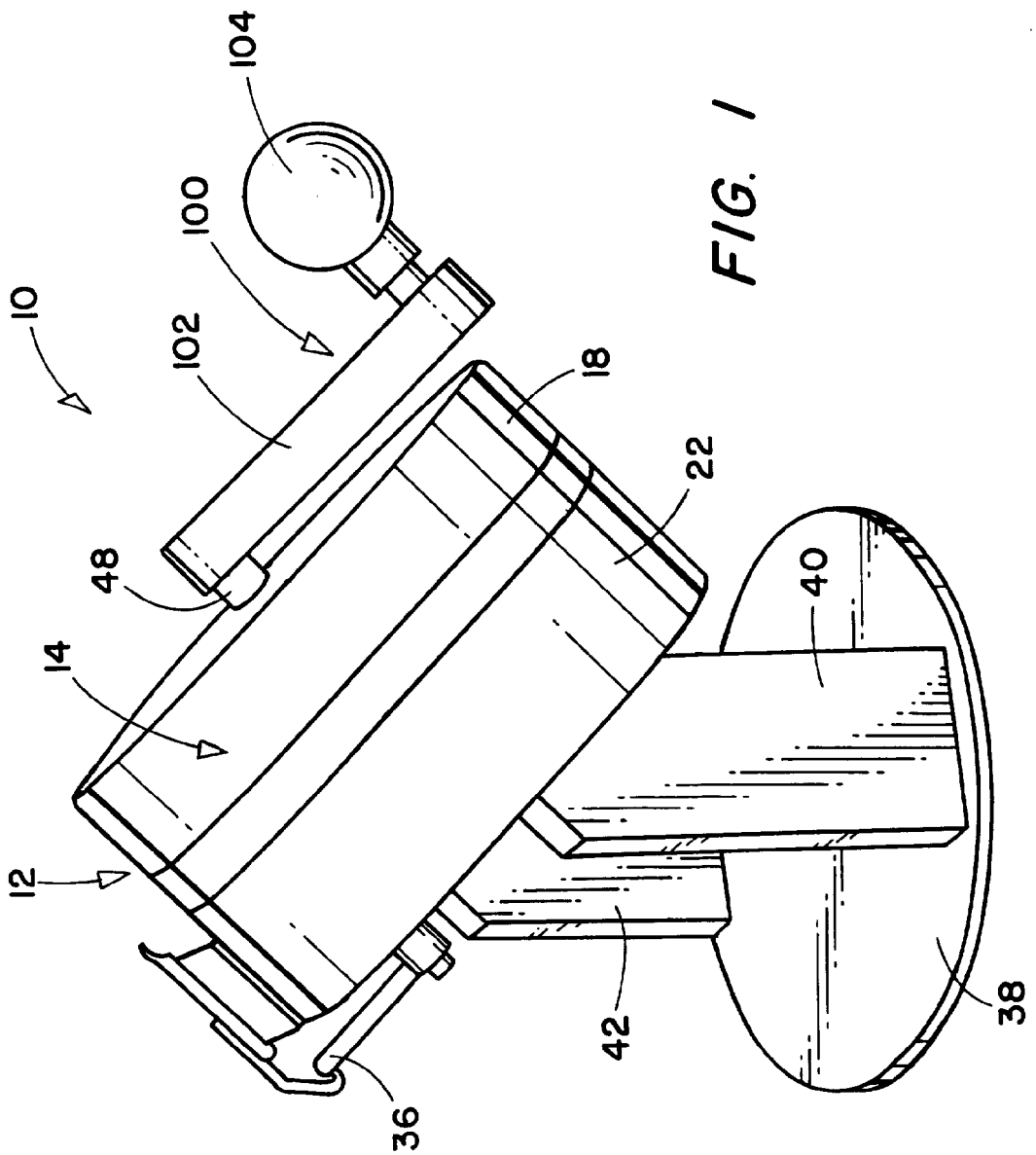
FIG. 1 is a side perspective view of one embodiment of the present invention arranged in operational position.
Figure 2:
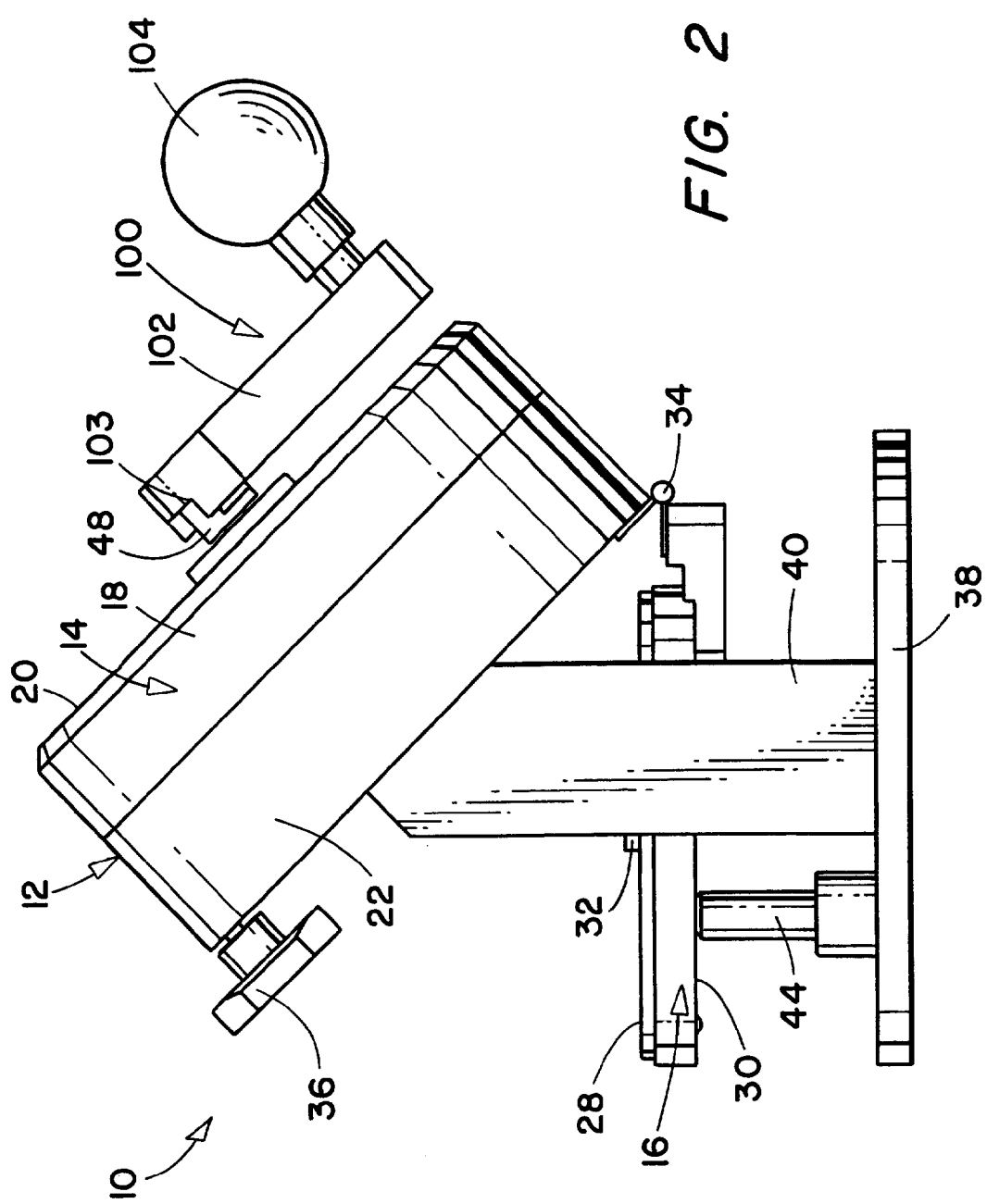
FIG. 2 is a side perspective view of the embodiment shown in FIG. 1 but illustrating the present invention in an open, loading position for receiving a CD.
Figure 3:
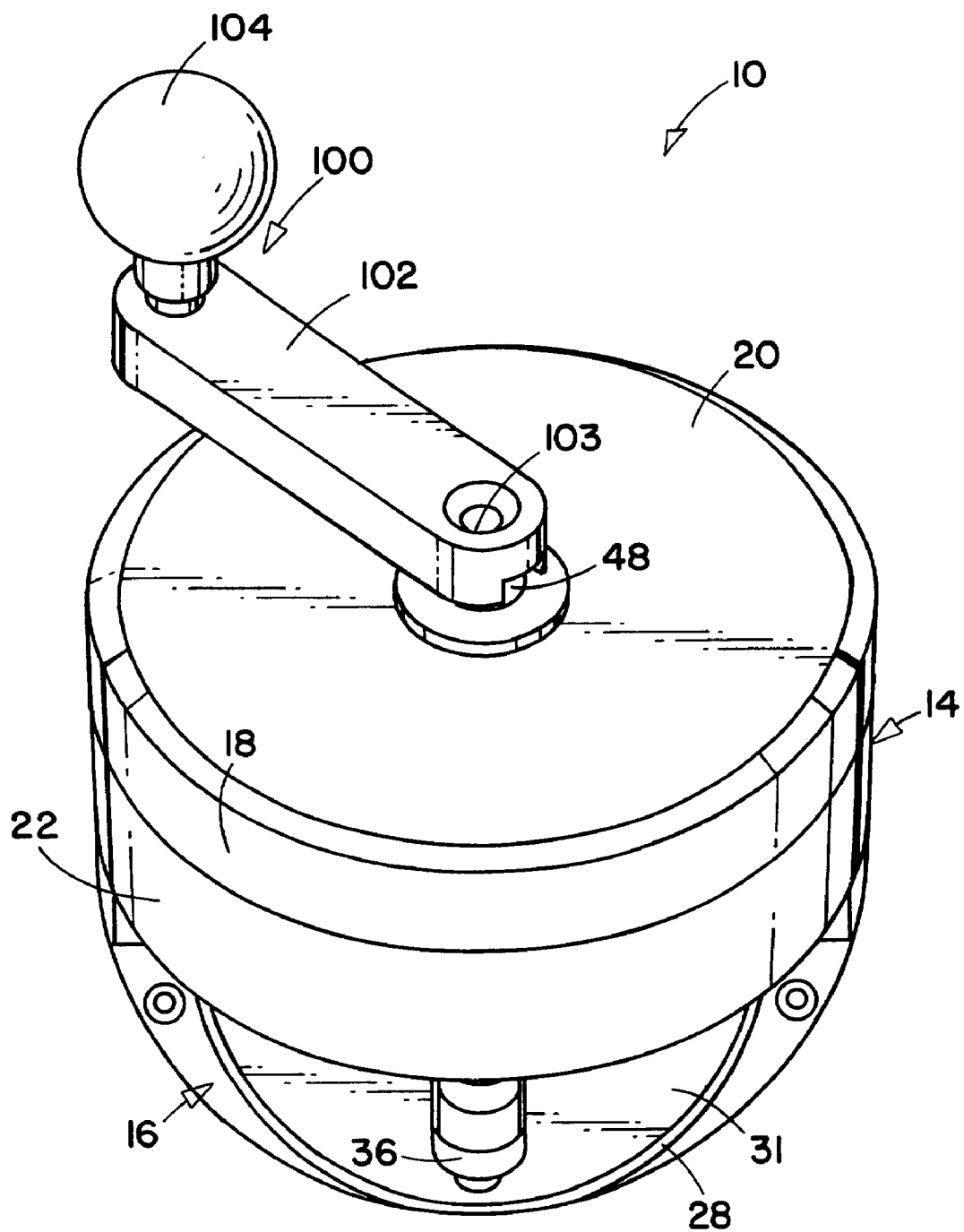
FIG. 3 is a top perspective view of the embodiment illustrated in FIG. 2.
Figure 4:
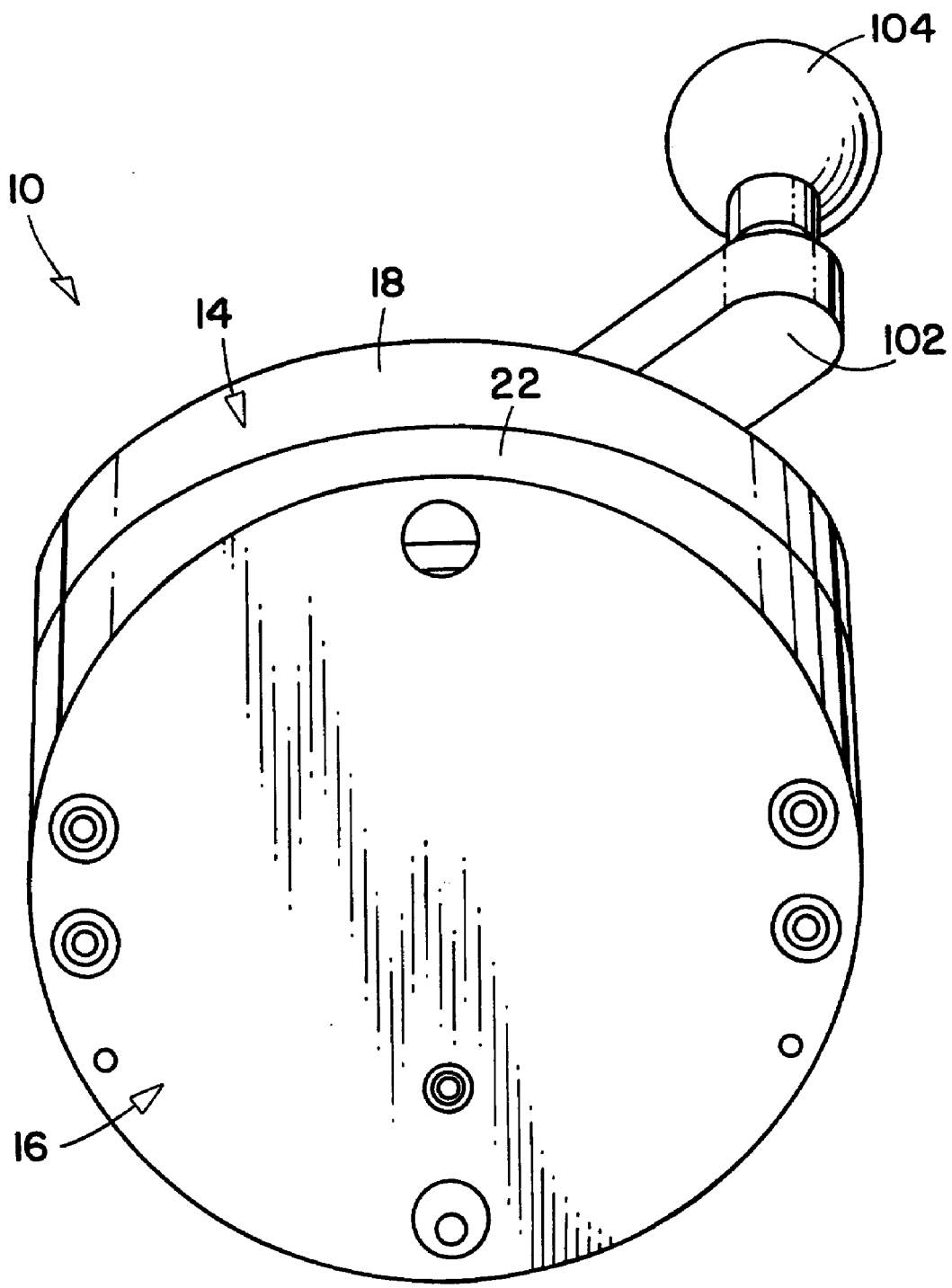
FIG. 4 is a bottom perspective view of the embodiment illustrated in FIG. 2.

Since the beginning of the CD-ROM and CDR industry, there has been a need to destroy the information and data carried by the compact disc as previously discussed. To date, there has been a distinct lack of field portable units available to the military or to such diverse businesses as banks and large corporations that publish confidential and sensitive information on CD-ROMs and which would enable such entities to accomplish the important objective of destroying the compact discs once their usefulness has expired. As previously indicated, the Department of Defence (DOD) has issued destruction standards for compact disc media. Whether the entire disc is destroyed or just the information bearing surface thereof, the resultant particulate material must be at least 250 microns or less in size. Otherwise, electron microscopy can be utilized to extract data and information from particles larger than this. Moreover, it is also highly desirable to be able to save the polycarbonate substrate layer of the compact disc for subsequent reuse. The device of the present invention accomplishes both of these very important functions.

Referring initially to FIGS. 1–5, a preferred embodiment of the present invention is illustrated. In preferred form, the device 10 includes a housing 12 having an upper member or portion 14 and a lower member 16. The upper portion 14 is preferably circular in shape and includes a top section 18 having an upper surface 20 and a bottom section 22. The top section 18 is secured to the bottom section 22 in any desired manner and preferably by utilizing bolts passing through the apertures 24. In preferred form, the housing 12 is made from stainless steel and defines a central cavity 26 therewithin having an open lowermost end.

The lower housing member 16 includes an interior surface 28 and an exterior surface 30. The interior surface 28 is preferably sized and shaped to receive a compact disc 31 thereon aligned about a central guide pin 32. The lower housing member 16 is selectively attachable to the upper member 14 and is preferably hinged thereto by a hinge member 34. When the lower housing member 16 is closed against the upper member 14, it is preferably locked in position by a lock element 36 which may be of any desired design. In this manner, when the lower member 16 is so closed against the upper housing member 14, the interior surface 28 and any CD 31 disposed thereon become encased within the now enclosed cavity 26.

In preferred form, the housing 12 is mounted to a stand 38 by a pair of brackets 40, 42. A pedestal element 44 braces the exterior surface 30 of the lower housing member 16 when the member 16 is unsecured to the upper member 12. In this manner, the interior surface 28 is readily accessible to position a CD 31 thereon while maintaining the lower member 16 in substantially parallel form to the stand 38 as particularly illustrated in FIG. 2.

Figure 5:
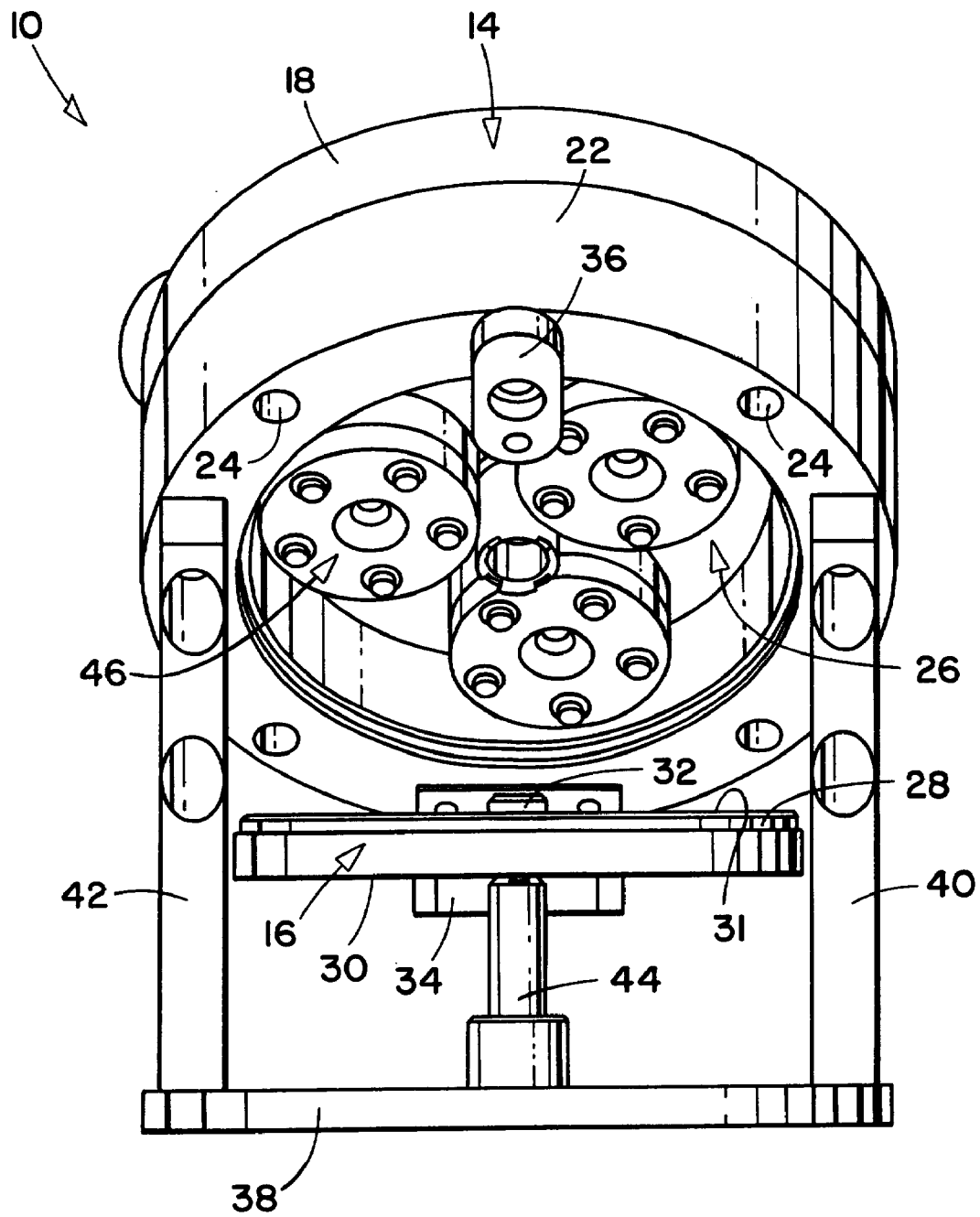
FIG. 5 is a front perspective view of the embodiment illustrated in FIG. 2 particularly illustrating one embodiment of the IBS grinding mechanism utilized in the present invention.
Figure 6:
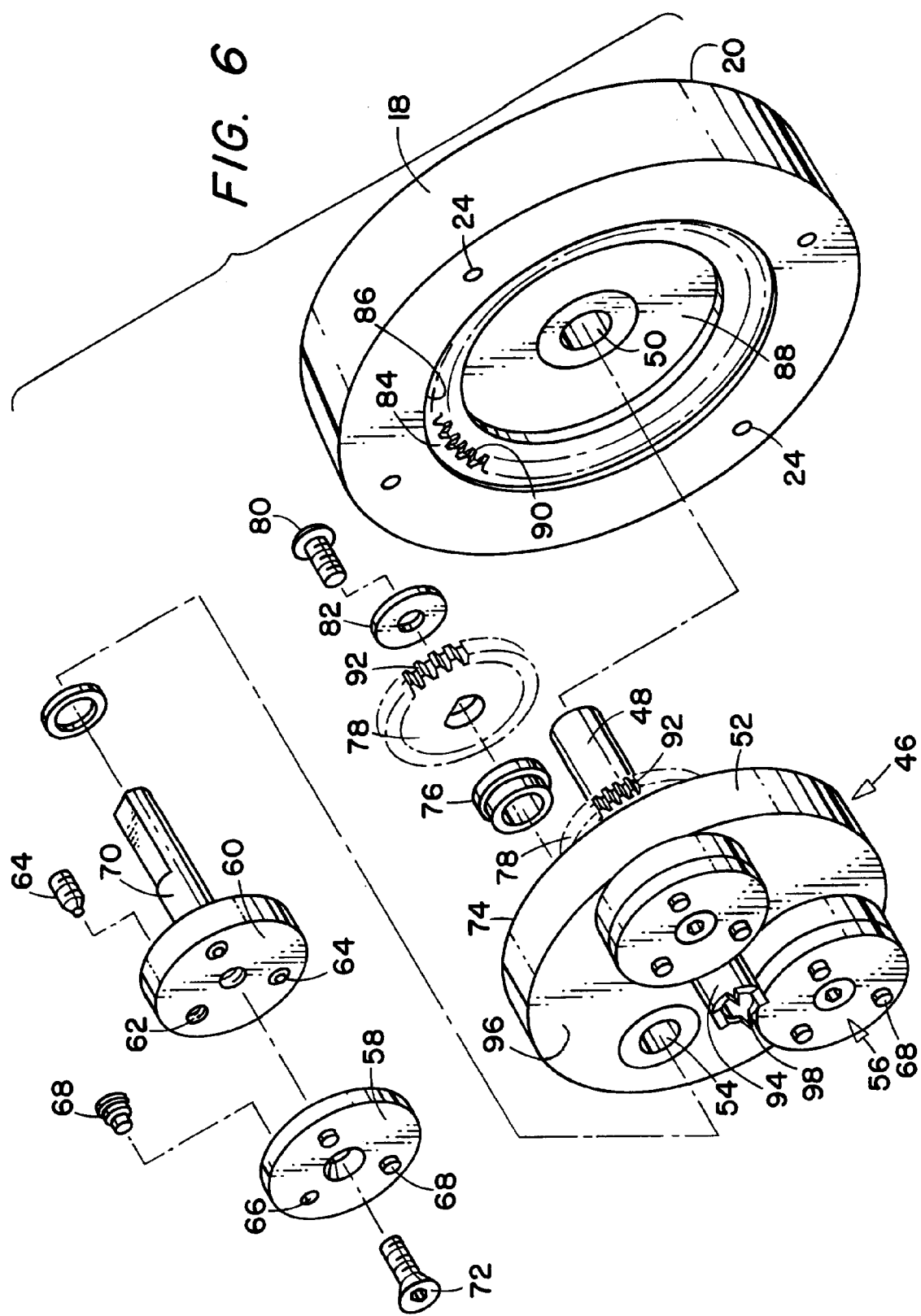
FIG. 6 is an exploded view illustrating the various components of one embodiment of the present invention.

Referring with more particularity to FIGS. 5 and 6, the cavity 26 houses the mechanism 46 for physically removing the information bearing surface (IBS) layer of a compact disc 31. This occurs when the disc 31 is positioned on the interior surface 28, and the lower member 16 is secured to the upper member 12 as shown in FIG. 1. In preferred form, the mechanism 46 is adapted to grind the IBS layer away from the substrate layer of a CD 31. While any number of grinding arrangements may be utilized within the cavity 26 to accomplish the purposes of the present invention and are thus envisioned as being within the scope of the invention, a preferred arrangement and embodiment is discussed and disclosed herein. However, it should be understood that the scope of the present invention shall not be limited to the particular configuration of the below described preferred embodiment.

To accomplish the above grinding function, the mechanism 46 preferably includes a central shaft 48 which is sized to pass through a central aperture 50 defined in the top section 18 and attached to a drive mechanism to be discussed in greater detail below. The drive mechanism is designed to selectively rotate the shaft 48 and anything connected thereto. In preferred form, the shaft 48 is attached to an annular mounting plate 52 which is positioned so as to freely rotate within the cavity 26. In preferred form, the plate 52 includes three substantially equally spaced apertures 54 therein. Each aperture 54 is designed to mount a head assembly 56.

Figure 7:
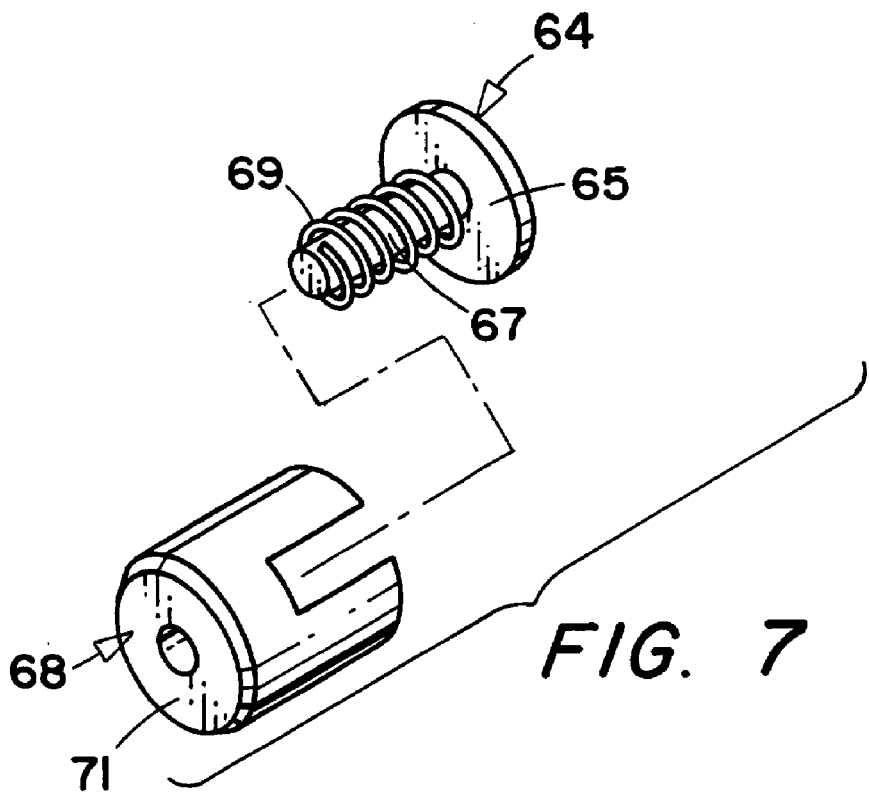
FIG. 7 is a schematic, exploded view of one grinding element embodiment utilized with the device of the present invention.
Figure 8:
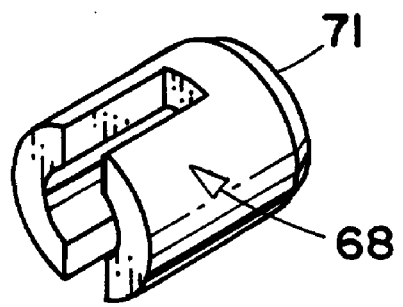
FIG. 8 is a rear perspective view of the grinding head portion of the embodiment illustrated in FIG. 7.

Each head assembly 56 preferably includes a pair of congruent disks 58 and 60. The bottom disk 60 includes a plurality of spaced apertures 62 which are sized and shaped to receive resilient spring members 64 therein. Likewise, the upper disk 58 includes a plurality of apertures 66 equal number to the apertures 62 and are sized and shaped to receive grinding elements 68 therein. In preferred form, there are 3 to 6 grinding elements 68 and corresponding resilient members 64 for each head assembly 56. Another embodiment illustrating the grinding element 68 of the present invention is shown in FIGS. 7 and 8. In this instance, the resilient member 64 includes a pin 65 having a shaft 67 with a coil spring 69 disposed thereabout. The grinding element 68 is then mounted about the shaft 67 so that the coil spring 69 continually urges the top surface 71 toward a compact disc 31.

Referring back to FIGS. 5 and 6, an axle 70 depends from the bottom surface of the lower disk 60 and is sized for positioning and rotatable movement within an aperture 54 in the plate 52. The disks 58 and 60 are secured together by any known mechanism and preferably a screw member 72. At the bottom surface 74 of the plate 52, a spacer or washer member 76 is preferably positioned about the shaft or axle 70, and a gear 78 is securely fastened nonrotatably to the axle 70. The gear 78 and spacer 76 are maintained in position on the axle 70 by a screw attachment member 80 and washer 82. In this manner, there are three gear members 78 positioned beneath the bottom surface 74 of the plate 52 associated with the three head assemblies 56. It should be understood that the gears 78 are sized and spaced so as to not interact with each other.

A gear ring 84 is preferably positioned along the internal circumferential edge 86 of the cavity 26 toward the bottom 88 thereof. The gear ring 84 includes a plurality of teeth 90 projecting radially outwardly toward the centerline of the upper housing member 14. The gear ring 84 is preferably sized and shaped such that the teeth 90 interact with the teeth 92 of each gear 78. In this manner, when the shaft 48 is rotated in one direction, the interaction between the teeth 90 and that teeth 92 cause of the counter-rotation of each head assembly 56 thereby enabling the grinding elements 68 to provide maximum interaction and abrasion with the surface of a compact disc 31 positioned on the interior surface 28.

The size and spacing of the head assemblies 56 are such that the grinding elements 68, which in preferred form are jeweler's polishing stones, are in firm contact with the information bearing surface layer of the CD 31 when the lower housing member 16 is closed and secured against the upper housing member 14. The resilient members 64 may be of any desired type of resilient spring members that continually urge and bias the grinding elements 68 axially outwardly from the top disk 58 toward the compact disc 31.

In preferred form, a shank 94 extends axially outwardly from the upper surface 96 of the mounting plate 52 and includes pin contacts 98 which are designed for engagement with the center portion of a compact disc 31. In this manner, the compact disc 31 is maintained in a fixed position as the head assemblies 56 are rotated across the information bearing surface thereof. It should be understood that the shank 94 does not rotate with the rotation of the mounting plate 52 thereby securing a CD 31 in position.

Figure 10:
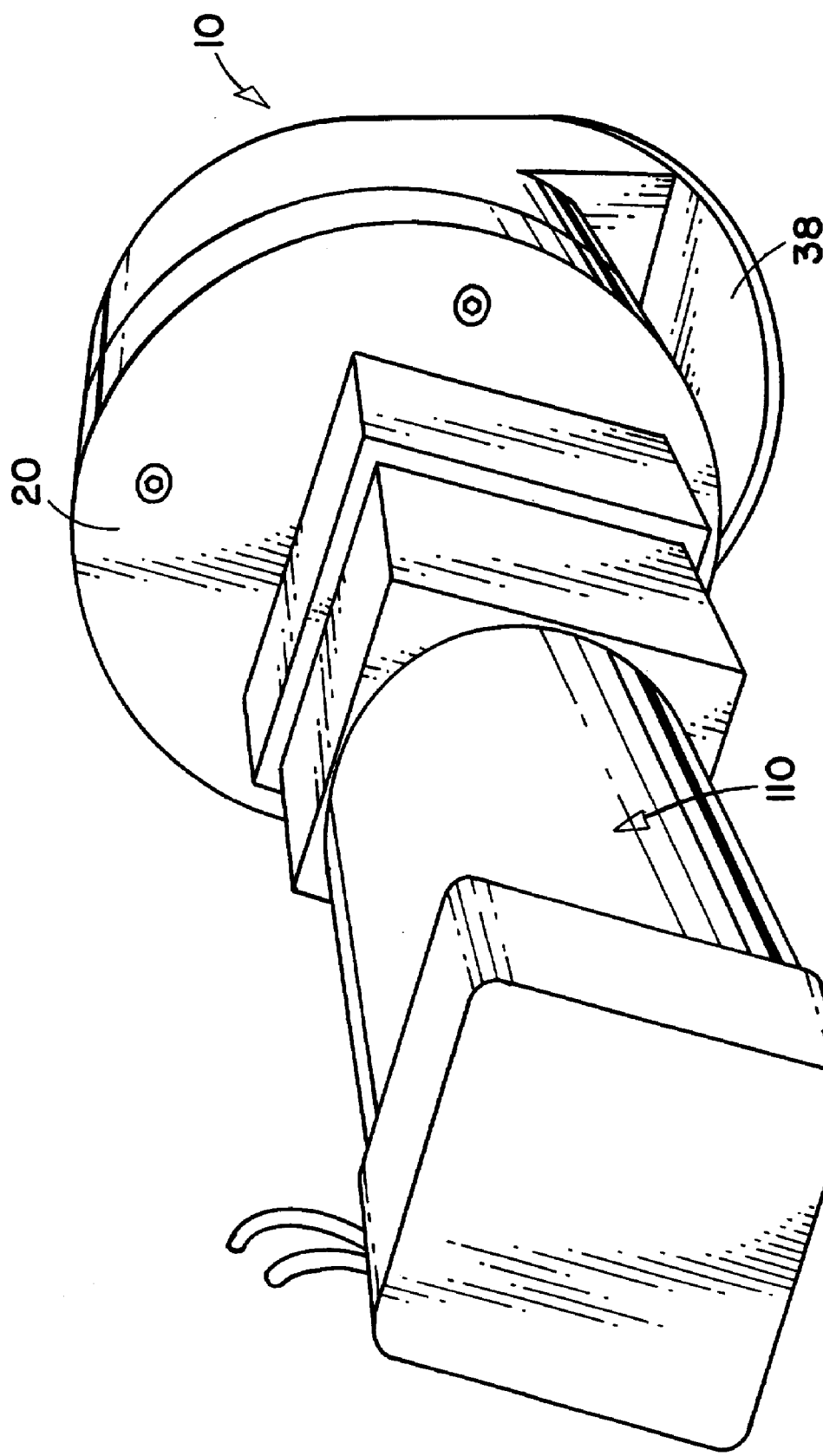
FIG. 10 is a rear perspective view of the fully assembled embodiment illustrated in FIG. 9.

As previously discussed, one primary benefit of the present invention is that it is field portable. In other words, the device 10 of the present invention does not require an external electrical power source for operation. In one preferred embodiment, and with particular reference to FIGS. 1–4, a hand crank 100 is utilized to rotate the shaft 48 and the grinding assembly 46. In preferred form, the hand crank 100 includes a crank arm 102 which is attached to the shaft 48 at 103 exteriorly to the surface 20. A handle 104 is secured to the opposite end of the crank shaft 102 and is provided for rotating the crank 100 about the shaft connection point 103. In an alternate embodiment, and with particular reference to FIGS. 9 and 10, a motor 110 may be utilized to turn the shaft 48 exterior to the top surface 20. The motor preferably 110 includes a mounting plate 112 which is bolted to the top surface 20 at connection points 114 and 116. The motor 110 can be a small electric motor powered by a field generator, or it can be a gasoline powered motor of any desired size or shape. Nonetheless, even utilizing the motor embodiment of the present invention, the device 10 of the present invention is still field portable and does not require any substantial external electric power source.

As can be seen from the above, the present invention provides a security device particularly adapted to destroying the information bearing surface layer of a compact disc in a rapid and efficient manner. Utilizing the present invention, the information bearing surface layer of a CD can be reduced to particulate size of only 2 microns, which is two orders of magnitude less than the minimum required by the Department of Defence. The device of the present invention weighs only approximately 30 pounds and has a height of about 8 inches, a width of about 10 inches and depth of about 10 inches. Consequently, the device of present invention is lightweight and easily portable.

The hand crank version of the present invention provides complete field portability for such a security device, while the motorized version provides field portability with only a slightly greater complexity. In either instance, however, the present invention is nonetheless completely field portable and therefore useful in a wide variety of situations where a larger machine or device would not effectively operate. In addition, the efficiency of the present invention enables rapid destruction of compact disc data and information for emergency security needs and purposes, requiring only 10 seconds to completely render a compact disc securely destroyed. This is all accomplished in an environmentally safe process where thre resultant particulate dust can be readily vacuumed out of the device and vented to the atmosphere. Thus, sensitive and confidential information can be accumulated in substantial amounts on compact discs, yet they are readily declassifiable in short order simply by utilizing the present invention.

The foregoing description and the illustrative embodiments of the present invention have been described in detail in varying modifications and alternate embodiments. It should be understood, however, that the foregoing description of the present invention is exemplary only, and that the scope of the present invention is to be limited to the claims as interpreted in view of the prior art. Moreover, the invention illustratively disclosed herein suitably may be practiced in the absence of any element which is not specifically disclosed herein.

We claim:

1. A device for removing the information bearing surface and the data carried thereby from the substrate layer of a compact disc, said device comprising:

housing means having an upper portion defining a top surface and a central cavity, and a lower portion having interior and exterior surfaces and being selectively attachable to said upper portion to enclose said interior surface within said cavity, said interior surface being sized and shaped for selectively carrying a compact disc;

means disposed within said cavity for physically removing the information bearing surface of a compact disc positioned on said lower portion interior surface;

means for biasing said physical removal means against the information bearing surface of a compact disc positioned on said interior surface as said information bearing surface is being removed; and means for actuating said physical removal means.

2. The device as claimed in claim 1, wherein said physical removal means comprises means for grinding said information bearing surface into particulate material having a size no greater than 250 microns while retaining the substrate layer of the compact disc substantially intact.

3. The device as claimed in claim 2, wherein said grinding means includes a plurality of disc grinding elements each mounted for continuous bias against the compact disc information bearing surface during the removal thereof.

4. The device as claimed in claim 3, wherein said bias means comprises a plurality of resilient members disposed for mounting said disc grinding elements.

5. The device as claimed in claim 1, wherein said physical removal means comprises a plurality of independently rotatable head assemblies disposed within said cavity, each said head assembly carrying a plurality of grinding elements mounted for continuous bias against the information bearing surface of a compact disc.

6. The device as claimed in claim 5, wherein said upper portion further includes a mounting plate disposed for rotation therewithin in response to said actuation means, and wherein said head assemblies are disposed in spaced relation on said mounting plate for rotation therewith as well as independent rotation relative thereto.

7. The device as claimed in claim 6, wherein said upper portion further includes gear means adapted to rotate said mounting plate in one direction while rotating said head assemblies in the opposite direction to maximize the abrasive action of said grinding elements against the information bearing surface of a compact disc.

8. The device as claimed in claim 7, wherein said actuation means comprises means for rotating said mounting plate and activating said gear means.

9. The device as claimed in claim 8, wherein said actuation means comprises a hand actuated crank member.

10. The device as claimed in claim 8, wherein said actuation means comprises a motor member.

11. The device as claimed in claim 1, wherein said device is field portable.

12. The device as claimed in claim 1, wherein said device further includes a shank member positioned to firmly hold a compact disc in position on said interior surface during the operation of said device and the removal of the information bearing surface of the compact disc.

13. A field portable device for the complete declassification of compact discs by the removal of information bearing layers therefrom, said device comprising:

an upper housing member defining a substantially cylindrical central cavity therewithin and an open lower end;

a lower housing portion including an interior surface sized and shaped to carry a compact disc, said lower housing portion being removably attachable to said upper housing portion for selectively covering said open lower end to enclose said interior surface within said cavity;

means disposed within said cavity for physically grinding the information bearing layer from the substrate layer of a compact disc mounted onto said interior surface;

means for biasing said grinding means against the information bearing layer of a compact disc positioned on said interior surface until said information bearing layer is entirely removed; and means for actuating said grinding means.

14. The device as claimed in claim 13, wherein said grinding means is adapted to reduce said information bearing layer to particulate matter of no greater than 250 microns in size while selectively retaining the substrate layer substantially in tact.

15. The device as claimed in claim 13, wherein said grinding means comprises a plurality of rotatable head assemblies each including a plurality of grinding elements mounted thereon for continuous bias against the information bearing layer of a compact disc mounted onto said interior surface.

16. The device as claimed in claim 15, wherein said bias means comprises a plurality of resilient members disposed for mounting said grinding elements to said head assemblies.

17. The device as claimed in claim 16, wherein each said head assembly includes three to six grinding elements.

18. The device as claimed in claim 16, wherein said upper housing member includes a mounting plate disposed therein for rotation in response to said actuation means, and wherein each said head assembly comprises a pair of congruent disks journaled together to mount said grinding elements against said resilient members, a shaft connected at one end to said journaled discs and passing through said mounting plate, and a gear secured to the opposite end of said shaft to form a single rotatable head assembly rotatable both with and relative to said mounting plate, each said head assembly being disposed in spaced relation on said mounting plate for independent rotation relative thereto.

19. The device as claimed in claim 18, wherein said upper housing member further includes a gear ring disposed about an interior circumferential edge thereof adapted to engage said head assembly gears to cause said head assemblies to rotate in a direction opposite that of the mounting plate in response to said actuation means.

20. The device as claimed in claim 13, wherein said actuation means comprises a hand actuated crank member.

21. The device as claimed in claim 13, wherein said actuation means comprises a motorized crank member.

22. In a device for the destruction of information layers of a compact disc to prevent the recovery of exploitable information therefrom including a housing for containing the compact discs to be destroyed and means for physically destroying the information layers thereof, the improvement wherein said device further comprises an upper housing member defining a central cavity therewithin having an open lower end, a lower housing member including an interior surface sized and shaped to carry a compact disc, said lower housing member being removably attachable to said upper housing member for selectively covering said open lower end to enclose said interior surface within said cavity, a plurality of rotatable head assemblies disposed within said cavity each including a plurality of grinding elements mounted thereon for bias against the information baring layer of a compact disc mounted onto said interior surface, resilient means for biasing said grinding elements against the information bearing layer of a compact disc positioned on said interior surface until said information bearing layer is entirely removed, and means for actuating said head assemblies and grinding elements.

23. The improvement as claimed in claim 22, wherein said upper housing member further includes a mounting plate disposed therein for rotation in response to said actuation means, and wherein each said head assembly comprises a pair of congruent disks journaled together to mount said grinding elements against said resilient means, a shaft connected at one end to said journaled discs and passing through said mounting plate, and a gear secured to the opposite end of said shaft to form a unitary head assembly rotatable relative to said mounting plate, each said head assembly being disposed in spaced relation on said mounting plate for independent rotation relative thereto.

24. The improvement as claimed in claim 23, wherein said upper housing member further includes a gear ring disposed about an interior circumferential edge thereof adapted to engage said head assembly gears to cause said head assemblies to rotate in a direction opposite that of the mounting plate in response to said actuation means to maximize the abrasive action of said grinding elements against said compact disc information layer to produce particulate matter of 250 microns and less in size.

* * * * *